Patented Sept. 14, 1943

2,329,395

UNITED STATES PATENT OFFICE 2,329,395

CERTAIN WATER-SOLUBLE HIGH MOLAL OXYALKYLATED ESTERS AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application March 21, 1941, Serial No. 384,597. Divided and this application June 26, 1942, Serial No. 448,684

11 Claims. (Cl. 260—404.8)

This invention relates to a new chemical product or compound, our present application being a division of our co-pending application Serial No. 384,597, filed March 21, 1941, now U. S. Patent No. 2,295,166, dated September 8, 1942.

One object of our present invention is to provide a new material, compound or composition of matter, that is capable of use for various purposes, and particularly adapted for use as a demulsifier in the resolution of crude oil emulsions.

Another object of our invention is to provide a practicable method for manufacturing said new material, compound or composition of matter.

The new chemical compound or composition of matter which constitutes our present invention is exemplified by the acidic, or preferably, neutral ester derived by complete esterification of one mole of a polyalkylene glycol of the kind hereinafter described, with a fractional ester derived from a hydroxylated material of the kind herein described, and a polybasic carboxy acid having not over six carbon atoms.

If a hydroxylated material, indicated for the sake of convenience, by the formula T.OH, is reacted with a polybasic carboxy acid, which, similarly, may conveniently be indicated as being of the dibasic type, by the formula HOOC.D.COOH, then the fractional ester obtained by reaction between equimolar quantities may be indicated by the following formula:

HOOC.D.COO.T

The polyethylene glycol may be characterized by materials of the kind such as heptaethylene glycol, octaethylene glycol, nonaethylene glycol, decaethylene glycol, to and including heptadecaethylene glycol. For convenience, these polyethylene glycols may be indicated by the following formula:

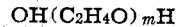

OH(C₂H₄O)$_m$H in which $m$ varies from 7 through 17.

Instead of polyethylene glycols, one may use polypropylene glycols or polybutylene glycols. Thus, for convenience, in the broadest aspect, the polyalkylene glycols employed may be indicated by the following formula:

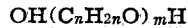

OH(C$_n$H$_{2n}$O)$_m$H in which $m$ has its previous significance and $n$ represents a numeral varying from 2 to 4.

Thus, the bulk of the materials herein contemplated, particularly for use as demulsifiers, may be indicated within certain variations, as hereinafter stated, by the neutral ester derived by esterification of one mole of a glycol of the kind above described with two moles of a fractional ester of the kind previously described. The formation of the compound may be indicated by the following reaction, although obviously, it is immaterial what particular procedure is employed to produce the particular chemical compound or product:

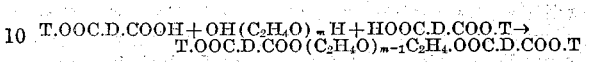

T.OOC.D.COOH+OH(C₂H₄O)$_m$H+HOOC.D.COO.T→
T.OOC.D.COO(C₂H₄O)$_{m-1}$C₂H₄.OOC.D.COO.T

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned largely with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8–12 oxyalkylene groups, particularly 8–12 oxyethylene groups. The preference to use the oxyethylated compounds is due largely to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly, minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethylene glycols. These materials are available in the form of a waxy water-soluble material, and the general range may vary somewhat from deca- to tetradeca-ethylene glycol. As is well understood, the method of producing such glycols would cause some higher homologs to be formed; and thus, even in this instance there may be present some oxyethylene glycols within the higher range above indicated. One need not point out that these particular compounds consist of mixtures, and that in some instances, particularly desirable esters, are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol, or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances we have found little tendency to form longer chain polymers; and in fact, the product of reaction, if conducted at reasonably low temperatures, appears to be largely monomeric. For convenience, such intermediate product may then be considered as a dibasic or polybasic acid. One mole of the intermediate so obtained is then reacted with two moles of the alcoholic material of the kind subsequently described.

It is to be noted, however, that if one prepares a fractional acidic ester, then if two moles of the fractional acidic ester are reacted with one mole of the polyethylene glycol, there is no possibility for the formation of polymeric types of esterification products under ordinary conditions.

The alcoholic compounds employed as reactants in the manufacture of the new compounds or reagents herein described, are materials conveniently referred to as hydroxylated high molal esters of monohydric alcohols. They are invariably water-insoluble. They contain at least 11 carbon atoms, and may contain as many as 48 carbon atoms. They usually contain only one hydroxyl group, as, for example, when derived from ricinoleic acid, but in some instances, as, for example, when derived from dihydroxystearic acid, they may contain more than one hydroxyl group. Since such esters are derivatives of monohydric alcohols, the hydroxyl group must be part of the acyl radical of the ester, and cannot be part of the alcohol residue, in contradistinction to esters of the kind exemplified by mono-olein, monostearin, etc.

Although the hydroxylated ester employed as a reactant in the manufacture of the compounds herein contemplated is water-insoluble, such ester may be derived from a water-soluble or water-insoluble acid, and from a water-soluble or water-insoluble alcohol. Generally speaking, such water-insoluble esters are obtained by the use of either a water-insoluble acid, or a water-insoluble alcohol as a secondary raw material for producing the ester. For instance, ethyl alcohol (a water-soluble alcohol), may be esterified with ricinoleic acid (a water-insoluble acid) to produce water-insoluble ethyl ricinoleate. Similarly, water-insoluble cetyl alcohol can be reacted with water-soluble lactic acid to produce the water-insoluble cetyl lactate. It is also obvious that the monohydric ether alcohols will function in the same manner as an alcohol, and thus may be employed in the production of the esters.

Briefly, then, the water-soluble alcohols or alcohol ethers, which serve as secondary raw materials for esterification to produce the water-insoluble esters, include ethylene glycol monomethyl ether; ethylene glycol monoethyl ether; ethylene glycol monobutyl ether; ethylene glycol monophenyl ether; ethylene glycol monobenzyl ether; diethylene glycol monomethyl ether; diethylene glycol monoethyl ether; diethylene glycol monobutyl ether; methyl alcohol; ethyl alcohol; isopropyl alcohol; normal butyl alcohol; methyl isobutyl carbinol; 2-ethyl butyl alcohol; normal hexyl alcohol; various isomeric amyl alcohols and mixtures thereof, etc. Other alcohols, not necessarily water-soluble, include 4-tertiary amyl cyclohexanol; 2,4-diamyl cyclohexanol; p-tertiary amyl ethanol; ditertiary amylphenoxy ethanol; methylamyl carbinol; octyl alcohol; 5-ethylnonanol-2; 7-ethyl-2-methyl undecanol-4; 3,9-diethyl tridecanol-6.

Purely as a convenience, then, the secondary raw materials, i. e., the alcohols employed to produce the water-insoluble esters, may be divided into two classes, i. e., the water-soluble alcohols and the high molal water-insoluble alcohols. Such high molal alcohols are invariably water-insoluble and contain at least 10 carbon atoms and not more than 32 carbon atoms. They usually contain only one hydroxyl group, but in some instances, as hereinafter indicated, they may contain more than one hydroxyl group. Such alcohols are generally obtained by reduction of the corresponding fatty acids or esters thereof. The reaction in its briefest form may be indicated as follows:

$$R.COOH \rightarrow RCH_2OH$$

R.COOH in the above instance may represent any detergent-forming acid, i. e., any of a number of monocarboxy acids having more than 9 and not over 32 carbon atoms, and characterized by the fact that they combine with alkalies such as caustic soda, caustic potash, ammonia, triethanolamine, and the like, to produce soap or soap-like materials. The best examples are, of course, the higher fatty acids, such as oleic acid, stearic acid, palmitic acid, etc. In addition to the higher fatty acids, other well known members include resinic acids, abietic acids, naphthenic acids, and acids obtained by the oxidation of petroleum hydrocarbons, and commonly referred to as oxidized wax acids. Generally speaking, the higher fatty acids are apt to contain from 12–14 carbon atoms as a lower limit, and from 18–22 carbon atoms as an upper limit. Oxidized waxes may contain as many as 30 or 32 carbon atoms. These various acids, when unsaturated, may be totally or partially hydrogenated, and then converted into the corresponding alcohol.

The commonest use of high molal alcohols has been their conversion into sulfates or sulfonates. As to patents which specifically enumerate high molal alcohols applicable for use as reactants in the manufacture of the present compound, see the following:

U. S. Patent No. 2,110,848, dated Mar. 8, 1938 to De Groote; 2,181,172, Oct. 4, 1932, Daimler et al.; 1,916,776, July 4, 1938, Steindorff et al.; 2,106,242, Jan. 25, 1938, DeGroote et al.; 2,106,243, Jan. 25, 1938, De Groote et al.; 2,110,847, Mar. 8, 1938, De Groote; 2,000,994, May 14, 1935, Schrauth; 2,061,617, Nov. 24, 1936, Downing et al.; 2,061,618, Nov. 24, 1936, Downing et al.; 2,061,619, Nov. 24, 1936, Downing et al.; 2,061,620, Nov. 24, 1936, Downing et al.; 2,171,117, Aug. 29, 1939, Schrauth; 2,187,338, Jan. 16, 1940, Werntz; 2,187,339, Jan. 16, 1940, Werntz; 1,917,255, July 11, 1933, Harris; 2,170,380, Aug. 22, 1939, Holsten; 1,966,187, July 10, 1934, Schirm.

Chemically, it is to be noted that these alcohols represent more than one type, i. e., they include aliphatic, alicyclic, aralkyl, etc. Particularly of interest are those derived from naphthenic acids, oxidized wax acids, and by the total or partial hydrogenation of high molal aromatic alcohols or equivalent procedure. Branched chain alcohols are, of course, included. Any of the various high molal, water-insoluble alcohols occurring naturally in waxes in combined form, may be employed.

As specific examples, mention may be made of the following alcohols: Decyl, undecyl, dodecyl, tetradecyl, octadecyl, cetyl, oleyl, cholesterol, glycols of high molecular weight of the type exemplified by octadecane diol, octamethyl glycol, decamethyl glycol, and also alkyl, cycloalkyl, aralkyl, or aryl ethers of the different polyhydric alcohols, such as, for example, the cresylic, phenylic, benzylic, cyclohexylic, or naphthylic ethers of glycol or glycerol. Similarly, derivatives of diphenyl, such as hydroxy diphenyl and the hydroaromatic homologs, are suitable.

The hydroxy acids, as has been suggested, may be conveniently divided into the water-soluble, low molal type, and the water-insoluble, high molal type. The water-soluble type may be exemplified by glycollic acids, lactic acid, hydroxy butyric acid, etc.

The high molal alcohol acids, i. e., the high molal hydroxy acids, are invariably water-insoluble.

The commonest example is ricinoleic acid. Other hydroxy fatty acids include hydroxystearic acid, dihydroxystearic acid, diricinoleic acid, aleuritic acid, and the like. Similar acids are obtained in the oxidation of paraffin, petroleum hydrocarbon, or wax, and are commonly referred to as hydroxylated wax acids. Hydroxylated wax acids occur as by-products in the oxidation of waxes or similar materials, and are usually separated so that the commonest commercial form of oxidized wax acids represent mixtures comparatively free from the hydroxylated compounds. Hydroxylated acids are produced by other procedures, such as chlorination, either by addition or substitution, as, for example, chlorination of oleic acid or stearic acid. Subsequent reactions involve the removal of the chlorine with the introduction of a hydroxyl radical. Undecylenic acid, derived from castor oil, has been converted into a hydroxy undecenoic acid. Unsaturated hydroxy acids, such as ricinoleic acid, may be treated in various manners, so as to produce derivatives, for example, chlorinated or brominated ricinoleic acid. Such materials are entirely satisfactory for use as reactants in the preparation of materials of the kind herein contemplated. Naturally-occurring naphthenic acids can also be converted into hydroxylated products by following similar procedure. An unsaturated hydroxy acid, such as ricinoleic acid, can be converted into a hydroxylated arylstearic acid. Such procedure contemplates reactions such as those involving ricinoleic acid, benzene, and aluminum chloride in large excess, or involves the desulfonation of a sulfoaromatic fatty acid. In any event, by employing derivatives of undecylenic acid, or one or more of the various wax acids, naturally-occurring naphthenic acid, ricinoleic acid, diricinoleic acid, or derivatives thereof, as have been enumerated, one can obtain a variety of hydroxylated monocarboxy acids, having at least 11 carbon atoms and not in excess of 36 carbon atoms. Such compounds are the kind herein contemplated as reactants to furnish the alcoholiform hydroxyl.

Hydroxy acids of the kind herein contemplated may also be prepared by the hydrolysis of alpha-halogen acids. For instance, alpha-bromocaproic acid, alpha-bromocaprylic acid, alpha-bromocapric acid, alpha-bromolauric acid, alpha-bromomyristic acid, alpha-bromopalmitic acid, and the like, can be hydrolyzed to give the corresponding alpha-hydroxy acid. Indeed, a reactive alpha-halogen acid may serve as a functional equivalent of an alpha-hydroxy acid by liberation of hydrochloric acid, instead of water. Such type of reaction, however, involves numerous difficulties; and thus, it is better to employ a hydroxy acid.

In some instances derivatives of hydroxylated unsaturated acids are most readily obtained by the employment of an intermediate in which the hydroxyl group is protected. Thus, ricinoleic acid may be acetylated, and such acetyl ricinoleic acid converted into a derivative, for instance, a derivative in which an aryl group is introduced. Such derivatives can then be saponified or hydrolyzed so as to regenerate the hydroxyl radical.

The actual preparation of esters and hydroxy acids is well known. The commonest esters, especially those available commercially, are invariably esters of ricinoleic acid. Esters including methyl ricinoleate, ethyl ricinoleate, propyl ricinoleate, butyl ricinoleate, amyl ricinoleate, hexyl ricinoleate, octyl ricinoleate, and the like, are employed for various purposes, and particularly as a constituent of hydraulic brake fluids. In the manufacture of esters in which there is considerable carbon atom interruption between the carboxyl group and the hydroxyl group, for instance, ricinoleic acid, as compared with lactic acid, one can produce the esters in the same manner employed to produce the corresponding esters of non-hydroxylated fatty acids, for instance, procedures employed in the manufacture of methyl oleate, butyl oleate, methyl stearate, butyl naphthenate, etc. Such procedures result in the formation of some polyricinoleic acids, and possibly esters of polyricinoleic acids. Naturally, the esters of polyricinoleic acids may be employed in the present process, for instance, a methyl ester of diricinoleic acid, or similar materials.

As to the manufacture of various esters of the kind herein described, attention is directed to the following United States patents, to wit:

No. 1,160,595, dated Nov. 16, 1915, to Gruter et al.; 2,221,674, Nov. 12, 1940, Ellis; 2,177,407, Oct. 24, 1939, Hansley. See also Organic Syntheses, volume X, page 88.

It is to be noted that one may, for example, produce materials having a fairly wide range, as far as carbon atoms are concerned. For instance, one may employ octyl lactate on one hand, or else, one might produce an alcohol having as many as 30 carbon atoms from an oxidized wax acid, and esterify the same with ricinoleic acid.

For all practical purposes, however, the best and most desirable compounds are obtained from the most commonly available esters, i. e., the esters of ricinoleic acid and the lower alcohols of the kind previously enumerated.

*Acidic intermediate product, Example 1*

One pound mole of nonaethylene glycol is reacted with two pound moles of maleic anhydride, so as to form nonaethylene glycol dihydrogen dimaleate.

*Acidic intermediate product, Example 2*

A mixture of lower non-distillable polyethylene glycols, representing approximately deca- to tetradeca-ethylene glycol, is substituted for nonaethylene glycol in the preceding example.

*Acidic intermediate product, Example 3*

A 50-50 mixture of nonaethylene glycol and lower non-distillable polyethylene glycols of the kind described in the previous example is substituted for nonaethylene glycol in Example 1.

*Acidic intermediate product, Example 4*

Adipic acid is substituted for maleic anhydride in Examples 1-3, preceding.

*Acidic intermediate product, Example 5*

Oxalic acid is substituted for maleic anhydride in Examples 1-3, preceding.

*Acidic intermediate product, Example 6*

Citric acid is substituted for maleic anhydride in Examples 1-3, preceding.

*Acidic intermediate product, Example 7*

Succinic anhydride is substituted for maleic anhydride in Examples 1-3, preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen or dried carbon dioxide, may be passed through the mixture. Sometimes it is desirable to add an esterification catalyst, such as sulfuric acid, benzene sulfonic acid, or the like. This is the same general procedure as is employed in the manufacture of ethylene glycol dihydrogen diphthalate. See U. S. Patent No. 2,075,107, dated March 30, 1937, to Frasier.

Sometimes esterfication is conducted most readily in the presence of an inert solvent which carries away the water of esterfication that may be formed, although, as is readily appreciated, such water of esterification is absent when the reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well known procedure and requires no further elaboration.

*Composition of matter, Example 1*

One pound mole of the intermediate product of the kind described in Intermediate product, Examples 1, 2 and 3, above, is reacted with two pound moles of methyl ricinoleate until all carboxyl acidity has disappeared. Time of reaction may vary from a few hours to as much as 20 hours.

*Composition of matter, Example 2*

Ethyl ricinoleate is substituted for methyl ricinoleate in the preceding example.

*Composition of matter, Example 3*

Propyl ricinoleate is substituted for methyl ricinoleate in Composition of matter, Example 1.

*Composition of matter, Example 4*

Butyl ricinoleate is substituted for methyl ricinoleate in Composition of matter, Example 1.

*Composition of matter, Example 5*

Amyl ricinoleate is substituted for methyl ricinoleate in Composition of matter, Example 1.

*Composition of matter, Example 6*

Hexyl ricinoleate is substituted for methyl ricinoleate in Composition of matter, Example 1.

*Composition of matter, Example 7*

Methyl diricinoleate is substituted for methyl ricinoleate in Composition of matter, Example 1.

*Composition of matter, Example 8*

Ethyl diricinoleate is substituted for methyl ricinoleate in Composition of matter, Example 1.

*Composition of matter, Example 9*

Methyl hydroxystearate is substituted for methyl ricinoleate in Composition of matter, Example 1.

*Composition of matter, Example 10*

Ethyl hydroxystearate is substituted for methyl ricinoleate in Composition of matter, Example 1.

*Composition of matter, Example 11*

Butyl hydroxystearate is substituted for methyl ricinoleate in Composition of matter, Example 1.

*Composition of matter, Example 12*

The same procedure is followed as in Composition of matter, Examples 1-11, inclusive, except that an intermediate product of the kind exemplified by Intermediate product, Example 4, is substituted for that in Intermediate product, Examples 1, 2 and 3.

*Composition of matter, Example 13*

The same procedure is followed as in Composition of matter, Examples 1–11, inclusive, except that an intermediate product of the kind exemplified by Intermediate product, Example 5, is substituted for that in Intermediate product, Examples 1, 2 and 3.

*Composition of matter, Example 14*

The same procedure is followed as in Composition of matter, Examples 1–11, inclusive, except that an intermediate product of the kind exemplified by Intermediate product, Example 6, is substituted for that in Intermediate product, Examples 1, 2 and 3.

*Composition of matter, Example 15*

The same procedure is followed as in Composition of matter, Examples 1–11, inclusive, except that an intermediate product of the kind exemplified by Intermediate product, Example 7, is substituted for that in Intermediate product, Examples 1, 2 and 3.

It is to be noted that this second step is an esterification reaction, and the same procedure is employed as suggested above in the preparation of the intermediate product. Needless to say, any particular method may be used to produce the desired compounds of the kind indicated. In some instances it may be desirable to conduct the esterification reaction in the presence of a nonvolatile inert solvent which simply acts as a diluent or viscosity reducer.

In the preceding examples, attention has been directed primarily to the monomeric form, or at least, to the form in which the bifunctional alcohol, i. e., a glycol, and the polyfunctional acid, usually a bifunctional compound, react to give a chain type compound in which the adjacent acid and glycol nucleus occur as a structural unit. For instance, in the monomeric form this may be indicated in the following manner:

acid .... glycol .... acid

If, however, one prepared an intermediate product employing the ratio of three moles of maleic anhydride and two moles of nonaethylene glycol, the tendency would be to produce a product which might be indicated in the following manner:

acid ... glycol ... acid ... glycol ... acid

Similarly, three moles of the glycol and four moles of the acid might tend to give a combination which may be indicated thus:

acid .. glycol .. acid .. glycol ..
       acid .. glycol .. acid

Another way of stating the matter is that the composition may be indicated in the following manner:

TOOC.D.COO[(C$_2$H$_4$O)$_{m-1}$C$_2$H$_4$OOC.D.COO]$_x$T in which the characters have their previous significance and $x$ is a relatively small whole number less than 10 and probably less than 5; and in the monomeric form $x$, of course, is 1. The limitations on the size of $x$ are probably influenced largely by the fact that reaction leading to further growth is dependent upon random contact.

Some of the products are self-emulsifiable oils or self-emulsifiable compounds; whereas, others give cloudy solutions or sols; and the most desirable type is characterized by giving a clear solution in water, and usually in the presence of soluble calcium or magnesium salts, and frequently in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid instead of adipic acid;

(d) By using an alcoholic material of lower molecular weight, for instance, methyl ricinoleate, instead of butyl diricinoleate.

In any event, it is to be noted that the compounds of the type herein contemplated are limited to the water-soluble type, i. e., those which are self-emulsifying in water, or produce a sol or a molecular solution.

Actually, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base, for instance, ammonia, triethanolamine, or the like, especially in dilute solution. Naturally, precaution should be taken so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Materials of the kind herein contemplated may find uses as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like; as a constituent of soldering flux preparations; as a flotation reagent in the flotation separation of various minerals; for flocculation and coagulation of various aqueous suspensions containing negatively charged particles such as sewage, coal washing waste water, and various trade wastes and the like; as germicides, insecticides, emulsifiers for cosmetics, spray oils, water-repellent textile finish, etc. These uses are by no means exhaustive.

However, the most important phase of the present invention, as far as industrial application goes, is concerned with the use of the materials previously described as demulsifiers for water-in-emulsions, and more specifically, emulsions of water or brine in crude petroleum.

We have found that the particular chemical compounds or reagents herein described and desirable for use as demulsifiers, may also be used for other purposes, for instance, as a break inducer in doctor treatment of the kind intended to sweeten gasoline. See U. S. Patent No. 2,157,223, dated May 9, 1939, to Sutton.

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote and Keiser. As to using compounds of the kind herein described as demulsifiers, or in particular as surface tension depressants in combination with mineral acid or acidization of oil-bearing strata, reference is made to U. S. Patent No. 2,233,383, dated February 25, 1941, to De Groote and Keiser.

It will be apparent to those skilled in the art that residual carboxyl acidity can be eliminated by esterification with low molal alcohol, for instance, ethyl, methyl, or propyl alcohol, by conventional procedure, so as to give a substantially neutral product. The introduction of such low molal hydrophobe groups does not seriously affect the solubility, and in some instances gives increased resistance to soluble calcium and magnesium salts, for such property is of particular value. Usually, however, neutralization with a dilute solution of ammonia or the like is just as practicable and less expensive.

In the hereto attached claims four primary reactants are referred to, to wit, monocarboxy hydroxy acids, monohydric alcohols, polyalkylene glycols, and polybasic carboxylic acids. The esters derived from the monocarboxy hydroxy acids and the monohydric alcohols are referred to in the claims as "alcoholic intermediates," insofar that they contain an alcoholiform hydroxyl radical as part of the acyl radical. The fractional esters derived from the polyalkylene glycols and the polybasic carboxylic acids are referred to in the claims as "acidic intermediates," since they possess a free carboxyl radical. In the hereto attached claims the water-soluble ester referred to is the product resulting from the interaction of the aforementioned alcoholic and acidic intermediates.

Having thus described our invention, what we claim as new and desire to secure by Letters Patent is:

1. A water-soluble ester, being the resultant of two intermediate reactants, to wit, an acidic intermediate reactant and an alcoholic intermediate reactant; said acidic intermediate reactant being in turn the resultant fractional ester of two primary reactants, one being alcoholic and the other acidic; said primary alcoholic reactant consisting of a polyalkylene glycol having at least 7 and not more than 17 ether linkages; and the alkylene radical thereof containing at least two and not more than 6 carbon atoms; and the acidic primary reactant being a polybasic carboxy acid having not more than 6 carbon atoms; and the ratio of the said primary esterifying reactants being within the range of more than 1 mole and not over 2 moles of the polybasic acid for each mole of the polyalkylene glycol; and the said intermediate alcoholic reactant being the ester of two additional primary reactants, and likewise, one being acidic and the other alcoholic, to wit, a monocarboxy hydroxy acid, and a monohydric alcohol; said intermediate alcoholic reactant containing at least 11 and not more than 42 carbon atoms; the ratio of the intermediate reactants being 2 moles of the alcoholic intermediate reactant for each mole of the acidic intermediate reactant.

2. A water-soluble ester, as defined in claim 1, with the added proviso that said ester must be neutral.

3. A water-soluble ester, as defined in claim 1, with the added proviso that said ester must be neutral and that the polybasic primary reactant be a dibasic carboxy acid having not more than 6 carbon atoms.

4. A water-soluble ester, as defined in claim 1, with the added proviso that said ester must be neutral; that the polybasic primary reactant be a dibasic carboxy acid having not more than 6 carbon atoms; and that the primary dihydric alcoholic reactant be a polyethylene glycol having at least 7 and not more than 17 ether linkages.

5. A water-soluble ester, as defined in claim 1, with the added proviso that said ester must be neutral; that the polybasic primary reactant be a dibasic acid having not more than 6 carbon atoms; that the primary dihydric alcoholic reactant be a polyethylene glycol having at least 7 and not more than 17 ether linkages; and that the intermediate alcoholic reactant be a water-insoluble ester of a monocarboxy hydroxy acid, and a monohydric alcohol; said ester containing at least 19 and not more than 42 carbon atoms.

6. A neutral water-soluble chemical compound, as defined in claim 1, and of the following structural formula:

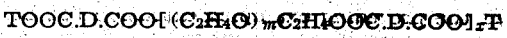

in which T is a monohydric alcohol-ricinoleic acid water-insoluble ester radical; the alcohol group of said ester being an alkyl radical having less than 9 carbon atoms; and D is the dibasic acid residue; $m$ represents a numeral varying from 7 to 12; and $x$ is a small whole number less than 10.

7. A neutral water-soluble chemical compound, as defined in claim 1, and of the following structural formula:

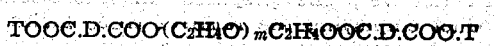

in which T is a monohydric alcohol-ricinoleic acid water-insoluble ester radical; the alcohol group of said ester being an alkyl radical having less than 9 carbon atoms; and D is the dibasic acid residue; and $m$ represents a numeral varying from 7 to 12.

8. A neutral water-soluble chemical compound, as defined in claim 1, and of the following structural formula:

in which T is a monohydric alcohol-ricinoleic acid water-insoluble ester radical; the alcohol group of said ester being an alkyl radical having less than 9 carbon atoms; and D is a maleic acid radical; and $m$ represents a numeral varying from 7 to 12.

9. A neutral water-soluble chemical compound, as defined in claim 1, and of the following structural formula:

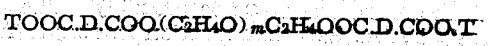

in which T is a monohydric alcohol-ricinoleic acid water-insoluble ester radical; the alcohol group of said ester being an alkyl radical having less than 9 carbon atoms; and D is a succinic acid radical; and $m$ represents a numeral varying from 7 to 12.

10. A neutral water-soluble chemical compound, as defined in claim 1, and of the following structural formula:

TOOC.D.COO(C$_2$H$_4$O)$_m$C$_2$H$_4$OOC.D.COO.T in which T is a monohydric alcohol-ricinoleic acid water-insoluble ester radical; the alcohol group of said ester being an alkyl radical having less than 9 carbon atoms; and D is an adipic acid radical; and $m$ represents a numeral varying from 7 to 12.

11. In the method of manufacturing a water-soluble ester, being the resultant of two intermediate reactants, to wit, an acidic intermediate reactant and an alcoholic intermediate reactant; said acidic intermediate reactant being in turn the resultant fractional ester of two primary reactants, one being alcoholic and the other acidic; said primary alcoholic reactant consisting of a polyalkylene glycol having at lest 7 and not more than 17 ether linkages; and the alkylene radical thereof containing at least two and not more than 6 carbon atoms; and the acidic primary reactant being a polybasic carboxy acid having not more than 6 carbon atoms; and the ratio of the said primary esterifying reactants being within the range of more than 1 mole and not over 2 moles of the polybasic acid for each mole of the polyalkene glycol; and the said intermediate alcoholic reactant being the ester of two additional primary reactants, and likewise, one being acidic and the other alcoholic, to wit, a monocarboxy hydroxy acid, and a monohydric alcohol, said intermediate alcoholic reactant containing at least 11 and not more than 42 carbon atoms; the ratio of the intermediate reactants being 2 moles of the alcoholic intermediate reactant for each mole of the acidic intermediate reactant; the steps of: (A) esterifying the monohydric alcohol with the monocarboxy hydroxy acid to yield the alcoholic intermediate reactant; (B) reacting the polyalkylene glycol with the polybasic carboxy acid to yield the acidic intermediate reactant; and (C) subsequently reacting said intermediate reactants to yield the water-soluble ester.

MELVIN DE GROOTE.
BERNHARD KEISER.